Patented May 14, 1940

2,200,279

UNITED STATES PATENT OFFICE 2,200,279

PROCESS FOR MAKING FATTY ACIDS

Hans Kaufmann, Munster, Westphalia, Germany

No Drawing. Application November 18, 1936, Serial No. 111,489. In Germany October 11, 1933

6 Claims. (Cl. 260—409)

In so far as they have a high content of unsaturated fatty acids, the fatty oils occurring in nature furnish inferior soaps. Such originating materials are subjected to a more or less extensive hardening treatment, in order to improve them. If the soaps are to be made by the carbonate process, the hardened fats are saponified by known methods. Less frequently, the reverse procedure is adapted, the fat being first saponified and the fatty acids hardened afterwards. Saturated fatty acids are also employed for other purposes, such as the manufacture of stearine.

My prior Patent No. 1,952,871 discloses a process of making fatty acids by dissociating fats and oils, which consists in decomposing fats and oils into free fatty acids and glycerine by means of water and simultaneously hydrogenating the product catalytically.

The invention consists in performing the hydrogenation and saponification in special order in one apparatus. In accordance with the oil or fat taken, or the quality of the desired end product, initially either hydrogenation or saponification is performed singly, up to a desired stage, the final treatment being then carried out in the same apparatus.

It is well known that fatty acids of different, though always high, degrees of hardness are required for different industrial purposes. For example, in the manufacture of cosmetics, almost completely saturated or hydrogenated fatty acids are necessary. On the other hand, stable and consistent soaps can be made with less saturated acids, e. g., with mixtures of acids in which only the more extremely unsaturated constituents have been hardened. In all cases, however, saponification must be as nearly complete as possible for the destruction of the glyceryl compounds of the originating oils or fats.

Further, it is known that the degree of hydrogenation increases with (a) greater percentage of catalyst used, (b) higher hydrogen pressure, or (c) slower heating, and vice versa, while the rate of saponification varies directly with the pressure under which it is effected.

Applying this knowledge to the process according to the invention, the quality (e. g. age, contamination) and the iodine number of the originating oil or fat being known, and the desired hardness of the completely saponified product being also known, one skilled in the art may determine the times separately required for each reaction with the optimum or available media, namely, the catalyst, the source of heat, and the means of supplying and maintaining pressure in the reaction vessel. By the two times thus determined, the order in which the two reactions are to be initiated in any given case, and the intermediate time for initiating the second reaction, are clearly indicated.

If hydrogenation constitutes the initial treatment, it is preferable to postpone adding water for effecting saponification until the oil or fat has been raised to the reaction temperature in presence of a catalyst and hydrogen, and preferably under high pressure. If the water be introduced after said temperature has been attained, the hardening process will progress in accordance with the amount of catalyst employed and the hydrogen present, saponification taking place simultaneously.

This method affords the advantage that both processes can be performed in one apparatus, while, at the same time, the heat of hydrogenation is utilised for the saponification process.

This method of procedure also enables the work to be performed with a considerably smaller amount of catalyst than when the two treatments are simultaneously started and effected in the one apparatus. In the latter case, if the catalyst is used in small proportion to the oil or fat (e. g., 0.01% of nickel) or is used repeatedly, the glycerol, which is formed in the saponification process and exerts an unfavourable influence on the activity of the catalyst. On the other hand, if the hydrogenation is partly effected before saponification is commenced, the glycerol is formed at a late stage in the process and has little effect on the catalyst. This advantage is particularly noticeable when catalysts of metal without carriers are employed, as catalysts in the form of metal supported by carriers are much less affected.

The following is an example of the procedure to be followed:

Example 1

100 parts of sunflower oil (acid value 2, and iodine value 102) are placed in an autoclave along with 0.01 part of nickel in the form of nickel formate. After the air has been displaced by hydrogen, the latter is compressed to about 20 atmospheres and heat is applied. While the temperature rises to about 200° C., extensive hydrogenation takes place. After 2 hours, 100 parts of preferably pre-heated water are forced in, and heating is continued, at 180–220° C., for about 3 hours longer. When the temperature of the autoclave has fallen to about 80° C., the contents are discharged and left to cool down further.

Glycerine water of excellent quality separates out, whilst the fatty acids show the iodine value 4, corresponding to a saponification of 94%.

This method has the aforesaid advantage of requiring only small amounts of catalysts, and of utilising the heating-up stage of the hardening treatment for the saponification process. Consequently, the latter is already more or less advanced, according to the amount of catalyser used and the rate of heating-up, before the introduction of the water. The process has the advantage that only one apparatus is needed, only a short time is required for carrying out both the reactions, and the heat liberated by the exothermic hydrogenation treatment is utilised for the whole process.

The process may, however, be performed by the reverse method, that is to say, the first stage may consist of more or less extensive saponification under high pressure, after which the catalyst (suspended in a little oil) is introduced at the same time as the hydrogen, under pressure. The modification is of advantage when dealing with aged and polymerised oils. The preliminary treatment with water renders innocuous the oxidation products, mucinous substances, etc., which may be present, whilst depolymerization takes place at the same time. In this method, the water and fat are brought into reaction under high pressure, the air in the apparatus having first been displaced, preferably by steam or hydrogen. When saponification has proceeded, to a smaller or greater extent, the catalyst (in slightly larger amount) and hydrogen are introduced under positive pressure. The catalyst (preferably a nickel catalyst) is first prepared in a small quantity of oil and, in association therewith, is introduced into the autoclave without difficulty.

The following is an example of the reverse method.

Example 2

100 parts of crude maize oil, which has stood for a long time and is difficult to harden, are placed in an autoclave with an equal amount of water, the air being then displaced by hydrogen and a pressure of 18–25 atmospheres is applied, saponification being effected, with frequent stirring, during 2 hours, at about 220° C. The next step is to add 0.2 part of nickel, produced by decomposing nickel formate in oil, the heating being continued with further additions of hydrogen. After another 2 hours a fatty acid with the acid value 190 and iodine value 45 is obtained. The pressure determines the speed of the saponifying reaction, which is more rapid with increase of pressure. If desirable, the pressure may be more or less than the limits above mentioned.

I claim:

1. Process for the production of fatty acids with a required high degree of saturation from oils and fats, by the steps of hydrogenation and saponification, characterised in that initially one of said steps is effected singly up to a partial stage, whereafter both steps are jointly carried on to simultaneous completion in the same apparatus.

2. Process for the production of fatty acids with a required high degree of saturation from oils and fats, comprising, in combination, the steps of initially hydrogenating the oil or fat to be treated with hydrogen in the presence of a catalyst, to a partial extent, and thereafter introducing an amount of water sufficient to effect saponification and jointly further hydrogenating and saponifying simultaneously to achieve complete saponification and the required degree of saturation.

3. Process for the production of fatty acids with a required high degree of saturation from oils and fats, comprising, in combination, the steps of initially saponifying the oil or fat to a partial extent with water at high temperature and under pressure, and thereafter introducing hydrogen under pressure and a catalyst, and jointly further saponifying and hydrogenating to achieve simultaneously complete saponification and the required degree of saturation.

4. Autoclave process for the production of fatty acids with a required high degree of saturation from oils and fats, comprising, in combination, the steps of introducing into the autoclave the oil or fat to be treated together with a nickel catalyst, displacing the air with hydrogen, raising the pressure of the hydrogen, heating to effect partial hydrogenation, injecting an amount of water sufficient for saponification, and continuing the heating jointly to achieve further hydrogenation to the required degree of saturation and to initiate and complete the saponification.

5. Autoclave process for the production of fatty acids with a required high degree of saturation from oils and fats, comprising, in combination, the steps of introducing into the autoclave the oil or fat to be treated and an equivalent quantity of water, displacing the residual air, heating to effect partial saponification, introducing a catalyst, introducing hydrogen under pressure, and continuing heating jointly to complete the saponification, and simultaneously to effect extensive hydrogenation to the required degree of saturation.

6. Process for the production of fatty acids with a required high degree of saturation from oils and fats, by the steps of hydrogenation and saponification, characterised in that initially one of said steps is effected singly up to a partial stage, whereafter the other step is initiated and both steps are jointly carried on to simultaneous completion in the same apparatus.

HANS KAUFMANN.